United States Patent
Ben-Shlomo et al.

(10) Patent No.: US 12,260,543 B2
(45) Date of Patent: Mar. 25, 2025

(54) MACHINE LEARNING BASED EXAMINATION OF A SEMICONDUCTOR SPECIMEN AND TRAINING THEREOF

(71) Applicant: Applied Materials Israel Ltd., Rehovot (IL)

(72) Inventors: Tal Ben-Shlomo, Givatayim (IL); Shalom Elkayam, Ramla (IL); Shaul Cohen, Irus (IL); Tomer Peled, Ness-Ziona (IL)

(73) Assignee: Applied Materials Israel Ltd., Rehovot (IL)

( * ) Notice: Subject to any disclaimer, the term of this patent is extended or adjusted under 35 U.S.C. 154(b) by 323 days.

(21) Appl. No.: 17/706,306

(22) Filed: Mar. 28, 2022

(65) Prior Publication Data

US 2023/0306580 A1  Sep. 28, 2023

(51) Int. Cl.
*G06T 7/00* (2017.01)
*G06T 7/11* (2017.01)

(52) U.S. Cl.
CPC ........ *G06T 7/001* (2013.01); *G06T 7/11* (2017.01); *G06T 2207/20081* (2013.01); *G06T 2207/30148* (2013.01)

(58) Field of Classification Search
CPC . G06T 7/001; G06T 7/11; G06T 2207/20081; G06T 2207/30148; G06T 2207/10061; G06T 2207/20084; G06T 7/0004; G06T 7/30; G06N 20/00; G06V 10/774; G01N 23/2251; G01N 2223/303; G01N 2223/304; G01N 2223/305; G01N 2223/401; G01N 2223/419; G01N 2223/6113; G01N 2223/6462; H01L 22/12

USPC .......................................................... 382/149
See application file for complete search history.

(56) References Cited

U.S. PATENT DOCUMENTS

| | | | |
|---|---|---|---|
| 10,957,034 B2* | 3/2021 | Cohen | G06T 7/001 |
| 2022/0012861 A1* | 1/2022 | Cohen | G06V 10/758 |
| 2023/0128610 A1* | 4/2023 | Yerushalmi | H01L 21/67288 706/12 |
| 2023/0136110 A1* | 5/2023 | Theagarajan | G06V 10/809 706/45 |
| 2023/0196732 A1* | 6/2023 | Kucher | G06T 5/50 382/149 |

(Continued)

*Primary Examiner* — Jerome Grant, II
(74) *Attorney, Agent, or Firm* — Lowenstein Sandler LLP (57) ABSTRACT

There is provided a system and method of runtime examination of a semiconductor specimen. The method includes obtaining a runtime image representative of an inspection area of the specimen, the runtime image having a relatively low signal-to-noise ratio (SNR); and processing the runtime image using a machine learning (ML) model to obtain examination data specific for a given examination application, wherein the ML model is previously trained for the given examination application using one or more training samples, each training sample representative of a respective reference area sharing the same design pattern as the inspection area and comprising: a first training image of the respective reference area having a relatively low SNR; and label data indicative of ground truth in the respective reference area pertaining to the given examination application, the label data obtained by annotating a second training image of the respective reference area having a relatively high SNR.

20 Claims, 5 Drawing Sheets

(56) References Cited

U.S. PATENT DOCUMENTS

| | | | |
|---|---|---|---|
| 2023/0260100 A1* | 8/2023 | Zhang | G06N 3/0464 |
| | | | 382/103 |
| 2023/0306580 A1* | 9/2023 | Ben-Shlomo | G06T 7/11 |
| 2023/0325413 A1* | 10/2023 | Yoshida | G06N 20/00 |
| 2023/0401694 A1* | 12/2023 | Lin | G03F 7/7065 |
| 2024/0069450 A1* | 2/2024 | Moin | G03F 7/705 |
| 2024/0183792 A1* | 6/2024 | Onishi | G01N 23/04 |

\* cited by examiner

MACHINE LEARNING BASED EXAMINATION OF A SEMICONDUCTOR SPECIMEN AND TRAINING THEREOF

TECHNICAL FIELD

The presently disclosed subject matter relates, in general, to the field of examination of a semiconductor specimen, and more specifically, to examination of a specimen using a specifically trained machine learning model.

BACKGROUND

Current demands for high density and performance, associated with ultra large-scale integration of fabricated devices, require submicron features, increased transistor and circuit speeds, and improved reliability. As semiconductor processes progress, pattern dimensions, such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Run-time examination can generally employ a two-phase procedure, e.g., inspection of a specimen followed by review of sampled locations of potential defects. Examination generally involves generating certain output (e.g., images, signals, etc.) for a specimen by directing light or electrons to the wafer and detecting the light or electrons from the wafer. During the first phase, the surface of a specimen is inspected at high-speed and relatively low-resolution. Defect detection is typically performed by applying a defect detection algorithm to the inspection output. A defect map is produced to show suspected locations on the specimen having high probability of being a defect. During the second phase, at least some of the suspected locations are more thoroughly analyzed with relatively high resolution, for determining different parameters of the defects, such as classes, thickness, roughness, size, and so on.

Examination can be provided by using non-destructive examination tools during or after manufacture of the specimen to be examined. A variety of non-destructive examination tools includes, by way of non-limiting example, scanning electron microscopes, atomic force microscopes, optical inspection tools, etc. In some cases both the two phases can be implemented by the same inspection tool, and, in some other cases, these two phases are implemented by different inspection tools.

Examination processes can include a plurality of examination steps. The manufacturing process of a semiconductor device can include various procedures, such as etching, depositing, planarization, growth such as epitaxial growth, implantation, etc. The examination steps can be performed a multiplicity of times, for example after certain process procedures, and/or after the manufacturing of certain layers, or the like. Additionally or alternatively, each examination step can be repeated multiple times, for example for different wafer locations, or for the same wafer locations with different examination settings.

By way of example, examination processes are used at various steps during semiconductor fabrication to detect and classify defects on specimens, as well as perform metrology related operations. Effectiveness of examination can be improved by automatization of process(es) such as, for example, defect detection, Automatic Defect Classification (ADC), Automatic Defect Review (ADR), image segmentation, automated metrology-related operations, etc. Automated examination systems ensure that the parts manufactured meet the quality standards expected, and provide useful information on adjustments that may be needed to the manufacturing tools, equipment and/or compositions, depending on the type of defects identified.

In some cases, machine learning technologies can be used to assist the automated examination process so as to promote higher yield. For instance, supervised machine learning can be used to enable accurate and efficient solutions for automating specific examination applications based on sufficiently annotated training images.

SUMMARY

In accordance with certain aspects of the presently disclosed subject matter, there is provided a computerized system of runtime examination of a semiconductor specimen, the system comprising a processing and memory circuitry (PMC) configured to: obtain a runtime image representative of an inspection area of the semiconductor specimen, the runtime image having a relatively low signal-to-noise ratio (SNR); and process the runtime image using a machine learning (ML) model to obtain examination data specific for a given examination application, wherein the ML model is previously trained for the given examination application using one or more training samples, each training sample representative of a respective reference area sharing same design pattern as the inspection area and comprising: a first training image of the respective reference area having a relatively low SNR similar to the low SNR of the runtime image; and label data indicative of ground truth in the respective reference area pertaining to the given examination application, the label data obtained by annotating a second training image of the respective reference area having a relatively high SNR.

In addition to the above features, the system according to this aspect of the presently disclosed subject matter can comprise one or more of features (i) to (xii) listed below, in any desired combination or permutation which is technically possible:

(i). The runtime image and the one or more training samples are acquired by an electron beam tool.

(ii). The given examination application is one of: a segmentation application for segmenting the runtime image into one or more segments in the inspection area, a metrology application for obtaining one or more measurements with respect to a structural element in the inspection area, a defect detection application for detecting one or more defect candidates in the inspection area, and a defect classification application for classifying one or more defects in the inspection area.

(iii). The first training image is generated based on a first number of training frames acquired for the reference area, and the second training image is generated based on a second number of training frames acquired for the reference area. The first number is smaller than the second number, and the runtime image is generated based on the first number of runtime frames.

(iv). The second number of training frames comprises the first number of training frames.

(v). The first training image is generated based on a first dose of electrons, and the second training image is generated based on a second dose of electrons. The first dose is less than the second dose, and the runtime image is generated based on the first dose of electrons.

(vi). The label data is obtained based on at least one of: manual annotation, synthetically generated labels based on design data, machine learning derived labels, or a combination thereof.

(vii). The first training image and the second training image are registered to correct an offset therebetween so that the first training image and the label data are aligned.

(viii). The first training image is acquired prior to acquisition of the second training image.

(ix). The inspection area is a part of a sensitive layer of the semiconductor specimen which is inspectable only via images having a relatively low SNR.

(x). The given examination application is a segmentation application for segmenting the runtime image into one or more segments in the inspection area, and the label data is indicative of a specific segment of the one or more segments that each pixel of at least part of the runtime image belongs to.

(xi). The inspection area is from an inspection die of the semiconductor specimen, and the respective reference area is from a reference die of the semiconductor specimen or of a different semiconductor specimen.

(xii). The relatively low SNR and the relatively high SNR are relative to each other, or relative to a threshold.

In accordance with other aspects of the presently disclosed subject matter, there is provided a method of runtime examination of a semiconductor specimen, the method performed by a processor and memory circuitry (PMC) and comprising: obtaining a runtime image representative of an inspection area of the semiconductor specimen, the runtime image having a relatively low signal-to-noise ratio (SNR); and processing the runtime image using a machine learning (ML) model to obtain examination data specific for a given examination application, wherein the ML model is previously trained for the given examination application using one or more training samples, each training sample representative of a respective reference area sharing the same design pattern as the inspection area and comprising: a first training image of the respective reference area having a relatively low SNR similar to the low SNR of the runtime image; and label data indicative of ground truth in the respective reference area pertaining to the given examination application, the label data obtained by annotating a second training image of the respective reference area having a relatively high SNR.

In accordance with other aspects of the presently disclosed subject matter, there is provided a method of training a machine learning model usable for examining a semiconductor specimen, the method performed by a processor and memory circuitry (PMC) and comprising: obtaining a training set comprising one or more training samples, each training sample representative of a respective reference area having a given design pattern, the training sample comprising: a first training image having a relatively low signal-to-noise ratio (SNR); and label data indicative of ground truth in the respective reference area pertaining to the given examination application, the label data obtained by annotating a second training image of the respective reference area having a relatively high SNR; and training the ML model for the given examination application using the training set; wherein the ML model, upon being trained, is usable for processing a runtime image representative of an inspection area of the specimen sharing the same design pattern as the given design pattern and obtaining examination data specific for the given examination application, the runtime image having a relatively low SNR similar to the low SNR of the first training image.

These aspects of the disclosed subject matter can comprise one or more of features (i) to (xii) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method for runtime examination of a semiconductor specimen, the method comprising: obtaining a runtime image representative of an inspection area of the semiconductor specimen, the runtime image having a relatively low signal-to-noise ratio (SNR); and processing the runtime image using a machine learning (ML) model to obtain examination data specific for a given examination application, wherein the ML model is previously trained for the given examination application using one or more training samples, each training sample representative of a respective reference area sharing same design pattern as the inspection area and comprising: a first training image of the respective reference area having a relatively low SNR similar to the low SNR of the runtime image; and label data indicative of ground truth in the respective reference area pertaining to the given examination application, the label data obtained by annotating a second training image of the respective reference area having a relatively high SNR.

In accordance with other aspects of the presently disclosed subject matter, there is provided a non-transitory computer readable medium comprising instructions that, when executed by a computer, cause the computer to perform a method for training a machine learning model usable for examining a semiconductor specimen, the method comprising: obtaining a training set comprising one or more training samples, each training sample representative of a respective reference area having a given design pattern, the training sample comprising: a first training image having a relatively low signal-to-noise ratio (SNR); and label data indicative of ground truth in the respective reference area pertaining to the given examination application, the label data obtained by annotating a second training image of the respective reference area having a relatively high SNR; and training the ML model for the given examination application using the training set; wherein the ML model, upon being trained, is usable for processing a runtime image representative of an inspection area of the specimen sharing the same design pattern as the given design pattern and obtaining examination data specific for the given examination application, the runtime image having a relatively low SNR similar to the low SNR of the first training image.

These aspects of the disclosed subject matter can comprise one or more of features (i) to (xii) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "processing", "training", "acquiring", "segmenting", "detecting", "classifying", "generating", "registering", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the training system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology" or derivatives thereof used in this specification are not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as a "false alarm" defect) which can be disregarded because it has no effect on the functionality of the completed device and does not impact yield.

The term "defect candidate" used in this specification should be expansively construed to cover a suspected defect location on the specimen which is detected to have relatively high probability of being a defect of interest (DOI). Therefore, a defect candidate, upon being reviewed, may actually be a DOI, or, in some other cases, it may be a nuisance as described above, or random noise that can be caused by different variations (e.g., process variation, color variation, mechanical and electrical variations, etc.) during inspection.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
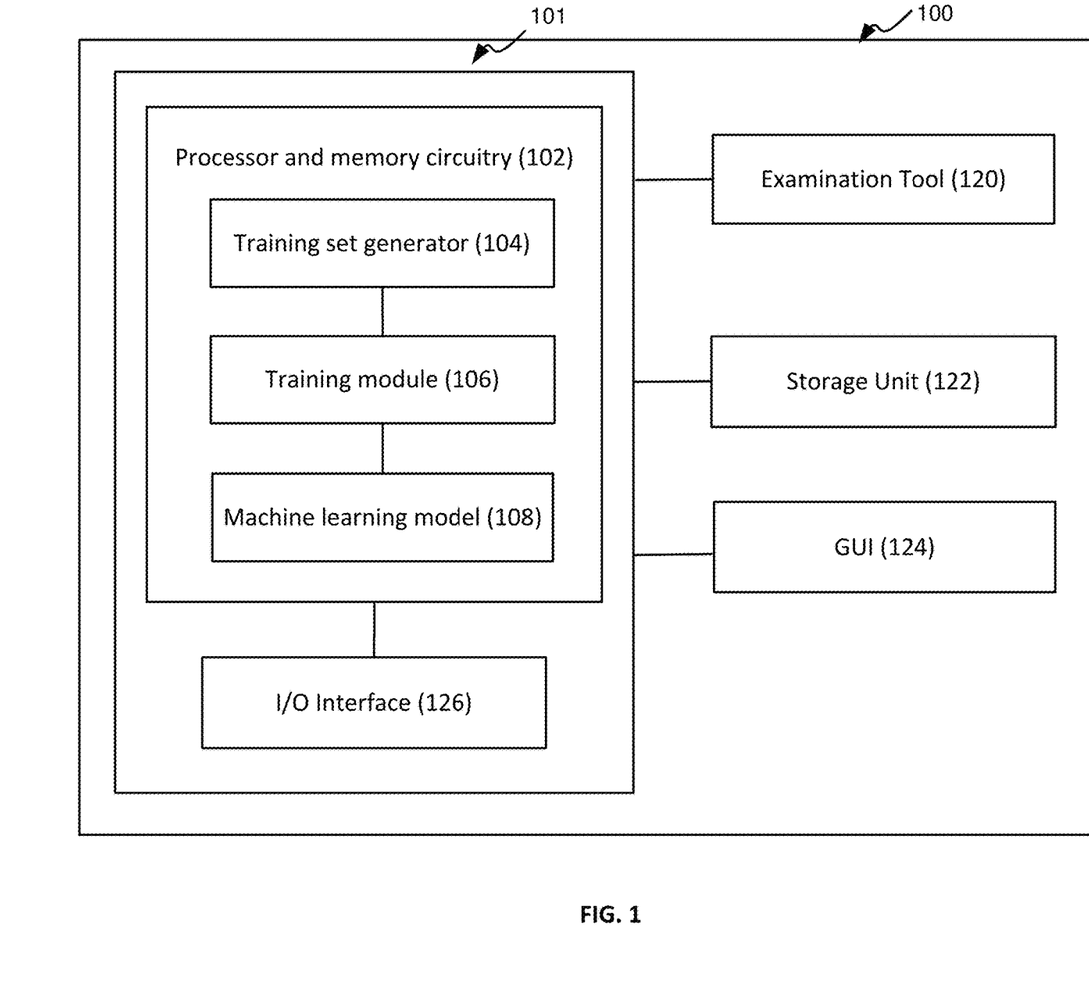
FIG. 1 illustrates a generalized block diagram of an examination system in accordance with certain embodiments of the presently disclosed subject matter.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect classification of various types, segmentation, and/or metrology operations, such as, e.g., critical dimension (CD) measurements, with respect to the specimen. The illustrated examination system 100 comprises a computer-based system 101 capable of enabling automatic examination of a semiconductor specimen based on machine learning (ML). According to certain embodiments of the presently disclosed subject matter, system 101 can be configured to examine a semiconductor specimen in runtime using a trained machine learning (ML) model based on images obtained during specimen fabrication (referred to herein also as fabrication process (FP) images or runtime images). In some embodiments, system 101 can be configured as a training system capable of training a ML model during a training/setup phase using a specifically generated training set.

System 101 can be operatively connected to one or more examination tools 120. The examination tools 120 are configured to capture runtime images and/or training images, process the captured images, and/or provide measurements related to the captured images.

By way of example, the runtime images and/or training images used herein can refer to original images of a specimen captured during the manufacturing process, derivatives of the captured images obtained by various pre-processing stages, and/or computer-generated design data-based images. For instance, the images can be selected from, e.g., images of a part of a specimen captured by a scanning electron microscope (SEM) or an optical inspection system, SEM images roughly centered around the defect to be classified by ADC, SEM images of larger regions in which the defect is to be localized by ADR, registered images of different examination modalities corresponding to the same location, segmented images, or height map images, etc. It is to be noted that in some cases the images referred to herein can include image data (e.g., captured images, processed images, etc.) and associated numeric data (e.g., metadata, hand-crafted attributes, etc.). It is further noted that image data can include data related to a layer of interest and/or to one or more layers of the specimen.

The term "examination tool(s)" used herein should be expansively construed to cover any tools that can be used in examination-related processes, including, by way of non-limiting example, imaging, scanning (in a single or in multiple scans), sampling, reviewing, measuring, classifying and/or other processes provided with regard to the specimen or parts thereof. The one or more examination tools 120 can include one or more inspection tools and/or one or more review tools. In some cases, at least one of the examination tools 120 can be an inspection tool configured to scan a specimen (e.g., an entire wafer, an entire die, or portions thereof) to capture inspection images (typically, at a relatively high-speed and/or low-resolution) for detection of potential defects (i.e., defect candidates). In some cases, at least one of the examination tools 120 can be a review tool, which is configured to capture review images of at least some of the defect candidates detected by inspection tools for ascertaining whether a defect candidate is indeed a defect of interest (DOI). Such a review tool is usually configured to inspect fragments of a specimen, one at a time (typically, at a relatively low-speed and/or high-resolution). The inspection tool and review tool can be different tools located at the same or at different locations, or a single tool operated in two different modes. In some cases, at least one examination tool can have metrology capabilities and can be configured to perform metrology operations on the images.

Without limiting the scope of the disclosure in any way, it should also be noted that the examination tools 120 can be implemented as inspection machines of various types, such as optical inspection machines, electron beam inspection machines (e.g., Scanning Electron Microscope (SEM), Atomic Force Microscopy (AFM), or Transmission Electron Microscope (TEM), etc.), and so on. In some cases, the same examination tool can provide low-resolution image data and high-resolution image data. The resulting image data (low-resolution image data and/or high-resolution image data) can be transmitted—directly or via one or more intermediate systems—to system 101. The present disclosure is not limited to any specific type of examination tools and/or the resolution of image data resulting from the examination tools.

As aforementioned, the examination system 100 comprises a computer-based system 101 capable of examining a semiconductor specimen in runtime using a trained machine learning (ML) model based on runtime images obtained during specimen fabrication. For training the ML model, sufficient training data is required. However, training images of the specimens to be inspected may be unavailable during the setup phase. In some cases, training images of test/reference wafers are used which may not include sufficient variations of structural parameters to produce a well-trained, accurate model that is robust with respect to process variations in actual production. Therefore, in order to have the ML trained to enable accurate examination, oftentimes the training of the ML model is performed at the customer site using images acquired from the actual production wafers. For instance, SEM images of a production wafer can be captured in FAB and used for the purpose of training the ML model.

A SEM image can be generated by aggregating a sequence of frames captured for an area of the semiconductor specimen, which are sequentially acquired by an electron beam examination tool such as a scanning electron microscope (SEM). In order to obtain a SEM image with higher quality (e.g., higher signal-to-noise ratio (SNR)), the electron beam dose used to scan the wafer (which can be reflected as the number of frames captured for the area and/or the strength of the electron beam used for capturing the frames) has to reach a certain amount so as to reduce noises in the resultant image.

On the other hand, as a consequence of an impact of the electron beam impinging on the specimen, the specimen can be physically damaged. This phenomenon is referred to as "shrinkage" or "slimming". For instance, a typical amplitude of shrinkage can be, e.g., between 5% to 10% of the dimensions of the structural features on the wafer, depending on the different layers and/or materials of a specimen, which is not desired for the customer. In some cases, in order to reduce such damage on a production wafer, in particular on certain sensitive layers of the wafer, the electron dose of the electron beam tool used for acquiring the frames is restricted. However, the SEM image obtained with such restriction is typically very noise with a low SNR. It is undesired, and in some cases even impossible, to perform annotation on a low SNR image, which is very challenging, even for manual annotation by a user. The resultant annotation on such images is likely to be inaccurate and error prone. Since the annotated label data are used as ground truth in the training of a ML model, the ML model trained using such training data cannot provide accurate and effective examination of the specimens.

Accordingly, certain embodiments of the presently disclosed subject matter propose a system (e.g., system 101) capable of training a ML model using training samples with specific composition so as to address the above issues. Certain embodiments of the present disclosure use a ML model trained in such way for runtime examination, as detailed below.

System 101 includes a processor and memory circuitry (PMC) 102 operatively connected to a hardware-based I/O interface 126. PMC 102 is configured to provide processing necessary for operating the system as further detailed with reference to FIGS. 2-4 and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

As aforementioned, in certain embodiments, system 101 can be configured as a training system capable of training a ML model using training samples during a training/setup phase. In such cases, functional modules comprised in PMC 102 can include a training set generator 104, a training module 106, and a machine learning model 108. The training set generator 104 can be configured to obtain a training set comprising one or more training samples. Each training sample is representative of a respective reference area that has a given design pattern. The training sample comprises a first training image having a relatively low signal-to-noise ratio (SNR), and label data indicative of ground truth in the respective reference area pertaining to the given examination application. The label data is obtained by annotating a second training image of the respective reference area having a relatively high SNR.

The training module 106 can be configured to train a machine learning model 108 for the given examination application using the training set. The ML model, upon being trained, is usable for processing a runtime image representative of an inspection area sharing the same design pattern as the given design pattern, and obtaining examination data specific for the given examination application. The runtime image is acquired with a relatively low SNR. Details of the training process are described below with reference to FIGS. 2 and 4.

According to certain embodiments, system 101 can be configured to examine a semiconductor specimen in runtime using the trained ML model based on runtime images obtained during specimen fabrication. In such cases, one or more functional modules comprised in PMC 102 can include the ML model 108 which has been trained as described above. The PMC 102 can be configured to obtain, via the I/O interface 126, a runtime image representative of an inspection area of the semiconductor specimen. The runtime image is acquired at a relatively low signal-to-noise ratio (SNR).

The trained ML model 108 is used to process the runtime image to obtain examination data specific for a given examination application. As described above, the ML model is previously trained for the given examination application using a training set comprising one or more training samples. Each training sample is representative of a respective reference area sharing same design pattern as the inspection area. Similarly, as described above, each training sample comprises a first training image having a relatively low SNR and label data indicative of ground truth in the respective reference area pertaining to the given examination application. The label data is obtained by annotating a second training image of the respective reference area having a relatively high SNR. Details of the runtime examination process are described below with reference to FIG. 3.

According to certain embodiments, the ML model can be trained for different examination applications, based on specific training images and label data pertaining to respective applications. Various applications that can be applicable using the present disclosure include, but not limited to, the following: a segmentation application for segmenting the runtime image into one or more segments in the inspection area, a metrology application for obtaining one or more measurements with respect to a structural element in the inspection area, a defect detection application for detecting one or more defect candidates in the inspection area, and a defect classification application for classifying one or more defects in the inspection area, etc.

Operation of system 101, PMC 102 and the functional modules therein will be further detailed with reference to FIGS. 2-4.

According to certain embodiments, the ML model 108 referred to herein can be implemented as various types of machine learning models, such as, e.g., decision tree, Support Vector Machine (SVM), Artificial Neural Network (ANN), regression model, Bayesian network, or ensembles/combinations thereof etc. The learning algorithm used by the ML model can be any of the following: supervised learning, unsupervised learning, or semi-supervised learning, etc. The presently disclosed subject matter is not limited to the specific type of ML model or the specific type or learning algorithm used by the ML model.

In some embodiments, the ML model can be implemented as a deep neural network (DNN). DNN can comprise a supervised or unsupervised DNN model which includes layers organized in accordance with respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized into a plurality of DNN sub-networks. Each layer of DNN can include multiple basic computational elements (CE) typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g., the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of a deep neural network can be initially selected prior to training, and can be further iteratively adjusted or modified during training to achieve an optimal set of weighting and/or threshold values in a trained DNN. After each iteration, a difference can be determined between the actual output produced by DNN module and the target output associated with the respective training set of data. The difference can be referred to as an error value. Training can be determined to be complete when a loss/cost function indicative of the error value is less than a predetermined value, or when a limited change in performance between iterations is achieved. A set of input data used to adjust the weights/thresholds of a deep neural network is referred to as a training set.

It is noted that the teachings of the presently disclosed subject matter are not bound by specific architecture of the ML or DNN as described above.

In some cases, additionally to system 101, the examination system 100 can comprise one or more examination modules, such as, e.g., defect detection module and/or Automatic Defect Review Module (ADR) and/or Automatic Defect Classification Module (ADC) and/or a metrology-related module and/or other examination modules which are usable for examination of a semiconductor specimen. The one or more examination modules can be implemented as stand-alone computers, or their functionalities (or at least part thereof) can be integrated with the examination tool 120. In some cases, the ML model 108 can be comprised in the one or more examination modules. Optionally, the ML model 108 can be shared between the examination modules or, alternatively, each of the one or more examination modules can comprise its own ML model 108.

According to certain embodiments, system 101 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store runtime images/training images and/or derivatives thereof produced by the examination tool 120. Accordingly, the images can be retrieved from the storage unit 122 and provided to the PMC 102 for further processing.

In some embodiments, system 101 can optionally comprise a computer-based Graphical User Interface (GUI) 124 which is configured to enable user-specified inputs related to system 101. For instance, the user can be presented with a visual representation of the specimen (for example, by a display forming part of GUI 124), including image data of the specimen. The user may be provided, through the GUI, with options of defining certain operation parameters, such as, e.g., a threshold with respect to SNR, the number of image frames to be captured, the specific examination application, etc. For instance, in some cases, the user can provide label data associated with a second training image by manually annotating on the image via the GUI 124. The user may also view the operation results, such as, e.g., examination data specific for a given examination application, on the GUI. In some cases, system 101 can be further configured to send, via I/O interface 126, the examination data to the examination tool 120 for further processing. In some cases, system 101 can be further configured to send some of the examination data to the storage unit 122, and/or external systems (e.g., Yield Management System (YMS) of a FAB).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least some of examination tools 120, storage unit 122 and/or GUI 124 can be external to the examination system 100 and operate in data communication with system 101 via I/O interface 126. System 101 can be implemented as stand-alone computer(s) to be used in conjunction with the examination tools, and/or with the additional examination modules as described above. Alternatively, the respective functions of the system 101 can, at least partly, be integrated with one or more examination tools 120, thereby facilitating and enhancing the functionalities of the examination tools 120 in examination-related processes.

Figure 2:
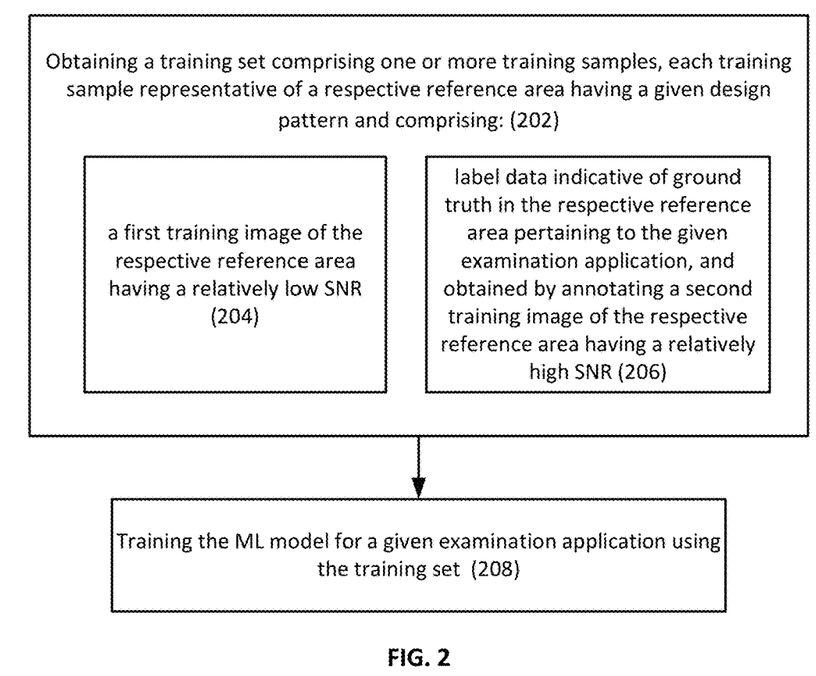
FIG. 2 illustrates a generalized flowchart of training a machine learning model usable for examining a semiconductor specimen in accordance with certain embodiments of the presently disclosed subject matter.
Figure 3:
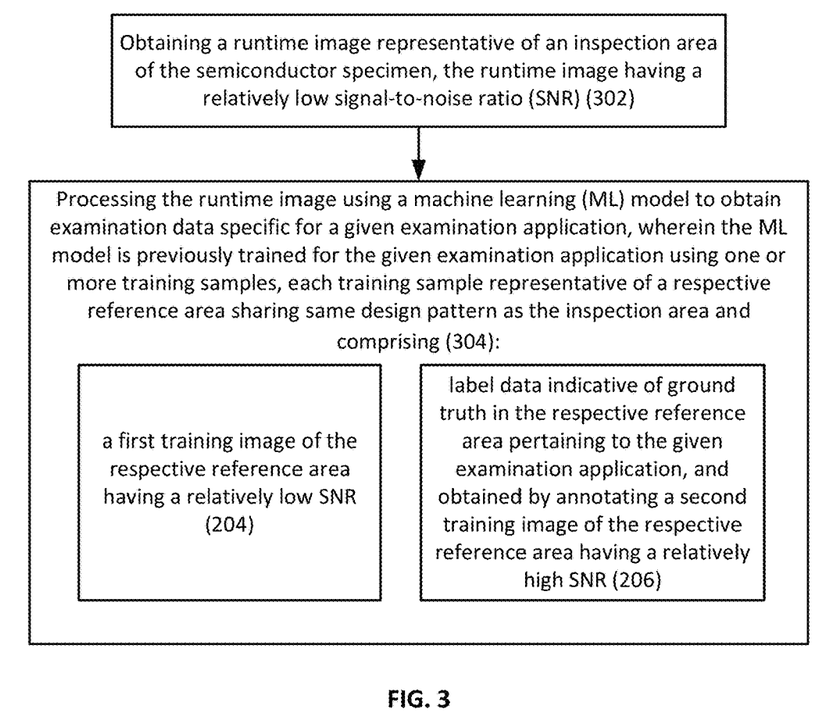
FIG. 3 illustrates a generalized flowchart of runtime examination of a semiconductor specimen using a trained ML in accordance with certain embodiments of the presently disclosed subject matter.
Figure 4:
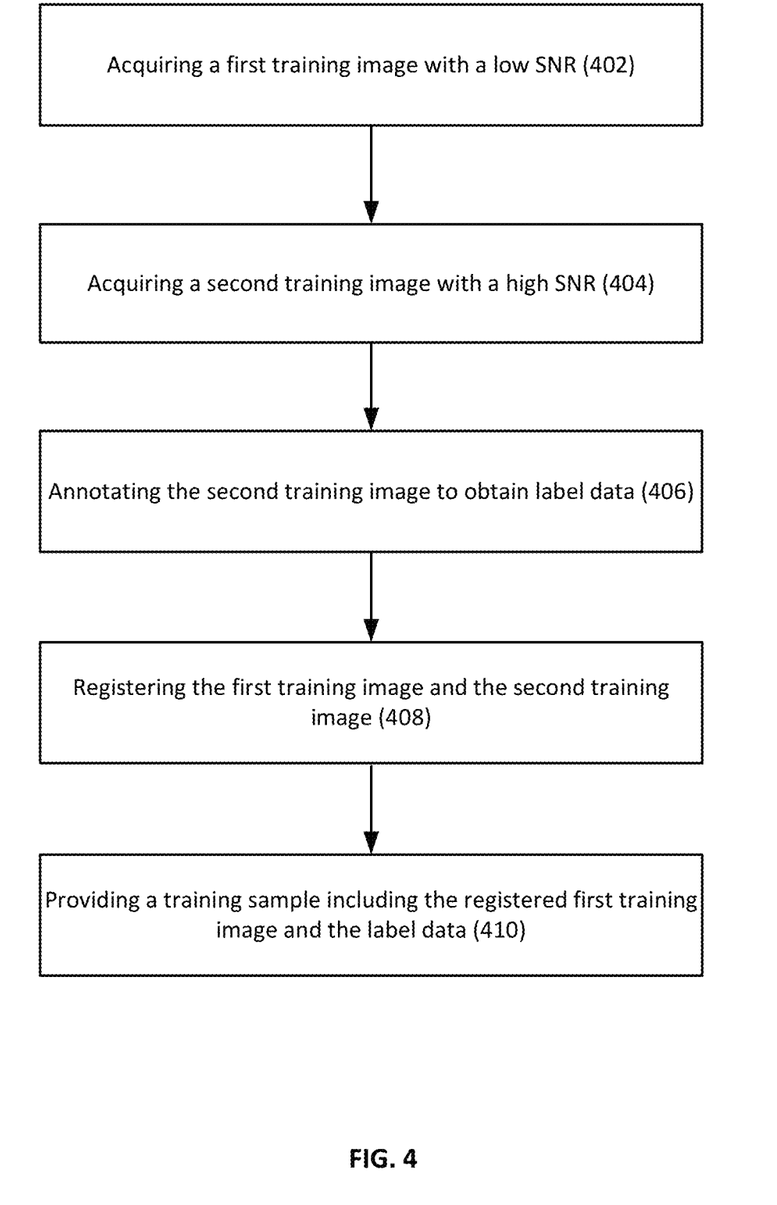
FIG. 4 illustrates a generalized flowchart of generating a training set for training a ML model usable for examining a semiconductor specimen in accordance with certain embodiments of the presently disclosed subject matter.

While not necessarily so, the process of operation of systems 101 and 100 can correspond to some or all of the stages of the methods described with respect to FIGS. 2-4. Likewise, the methods described with respect to FIGS. 2-4 and their possible implementations can be implemented by systems 101 and 100. It is therefore noted that embodiments discussed in relation to the methods described with respect to FIGS. 2-4 can also be implemented, mutatis mutandis as various embodiments of the systems 101 and 100, and vice versa.

For purpose of illustration only, certain embodiments of the following description may be provided for training a ML model usable for a segmentation application. Those skilled in the art will readily appreciate that the teachings of the presently disclosed subject matter are also applicable to various other examination applications, such as, for example, defect detection, ADR, ADC, metrology-related modules, and alike.

Referring to FIG. 2, there is illustrated a generalized flowchart of training a machine learning model usable for examining a semiconductor specimen in accordance with certain embodiments of the presently disclosed subject matter.

Training data used for training a ML model in supervised learning normally include one or more training samples, each including a respective training image and corresponding ground truth data associated therewith. Ground truth data can include label data of the training image which is indicative of application-specific information. By way of example, for an examination application of image segmentation, each training sample can include a training image of the semiconductor specimen and label data indicative of one or more segments in the training image.

A training image can be a "real world" image of a semiconductor specimen obtained in a fabrication process thereof. Depending on different examination applications, the training image can be obtained in various ways. By way of non-limiting example, the image can be an inspection image obtained by examining a specimen using one or more inspection tools for an application of detection of defect candidates. In another example, the image can be a review image obtained by examining the specimen at defect candidate locations using one or more review tools, for a defect review application of ascertaining whether a defect candidate detected by the inspection tools is indeed a defect, and/or for a defect classification application of ascertaining the class/type of the defect. Such review tools can be, e.g., a scanning electron microscope (SEM), etc.

Ground truth data can be obtained in various ways, such as, e.g., by manual annotation, synthetic generation based on design data, machine learning based, or a combination of the above, as will be detailed below with reference to FIG. 4.

As mentioned above, a ML model used for examining a semiconductor specimen is often trained at the customer site using production wafer data. In order to reduce the damage of the production wafer caused by the image acquisition (e.g., by SEM), the electron dose of the electron beam tool used for acquiring the frames (which can be represented by the number of frames captured and/or the strength of the electron beam used) should be restricted. However, the SEM images obtained with less electron dose are typically very noise with a low SNR. It is very difficult to make accurate annotation on such images, and in some cases even impossible. Therefore, the present disclosure proposes to acquire the training samples in a specific way for addressing the above issues, as detailed below with reference to FIGS. 2 and 4.

As described in FIG. 2, a training set can be obtained (202) (e.g., by the training set generator 104 in PMC 102), comprising one or more training samples. Each training sample is representative of a respective reference area of a specimen that has a given design pattern. In some embodiments, the given design pattern can be a pattern of interest to be examined on the specimen.

Specifically, the training sample comprises a first training image (204) having a relatively low signal-to-noise ratio (SNR) (e.g., relatively lower with respect to a higher SNR of a second training image, as described below, or with respect to a threshold), and label data (206) indicative of ground truth in the respective reference area pertaining to the given examination application. The label data is obtained by annotating a second training image of the respective reference area having a relatively high SNR (e.g., relatively higher with respect to the threshold). The ML model (e.g., the ML model 108) can be trained (208) (e.g., by the training module 106 in PMC 102) for the given examination application using the training set.

In some embodiments, when examining an area on the specimen, a plurality of frames of the area can be sequentially acquired by the examination tool (such as an electron beam tool, e.g., SEM). The frames acquired by the electron beam tool are subsequently aggregated to generate a final image, such as, e.g., a SEM image (e.g., by combining/averaging the plurality of frames so as to reduce the noises in the resultant image). As aforementioned, the electron dose of the electron beam tool used for acquiring the frames of a production wafer should be restricted for the purpose of reducing damage of the production wafer caused by the image acquisition. By way of example, the dose of electrons used can be reflected as the number of frames captured for the given area and/or the strength of the electron beam used for capturing the frames. For instance, for purpose of damage reduction, during runtime examination of an area of the specimen, a relatively small number of frames are captured for generating the SEM image. By way of another example, an electron beam with a smaller energy level can be used for generating the SEM image. A SEM image generated as such, however, tends to have a lower SNR, and is not suitable for image annotation.

Therefore, it is proposed that for one or more reference areas on a specimen that share the same given design pattern, two images can be captured for each reference area, including a first training image with a relatively low SNR, and a second training image with a relatively high SNR. In particular, the first training image has the same/similar SNR as the SNR of a runtime image which will be captured in production time (after the training and deployment of the ML model in production) and will be examined using the trained ML model. As aforementioned, the level of SNR of an image is generally correlated with the dose of electrons used for examining the specimen and generating the image.

Specifically, in some embodiments, the first training image can be generated based on a first dose of electrons, and the second training image can be generated based on a second dose of electrons, where the first dose of electrons is less/smaller than the second dose. In particular, the first dose of electrons used to capture the first training image is the same as the dose of electrons used for capturing a runtime image which will be examined using the trained ML model. It is to be noted that the term "the same" used herein can refer to either being identical, or similar to, or highly correlated with each other. Various similarity measures and algorithms can be used for determining the level of equivalence/similarity therebetween. Thus, wherever the term "the same" is used, it should not be limited to be exactly the same, but rather being similar/equivalent to a certain extent.

By way of example, as the dose of electrons can be reflected as the number of frames and/or the strength of the electron beam used for capturing the image, in some cases the first training image can be generated based on a first number of training frames acquired for the reference area, and the second training image can be generated based on a second number of training frames acquired for the reference area, where the first number is smaller than the second number. It is to be noted that the number of runtime frames used to generate a runtime image is the same as the first number (the number of frames used to generate the first training image), so as to ensure the similarity level of SNR between the first training image and the runtime image. In some cases, the first number (the number of frames used to generate the first training image) and the second number (the number of frames used to generate the second training image) can be defined according to the given examination application. By way of example, for a segmentation application, the first number (which corresponds to the number of runtime frames used to generate a runtime image) can be determined based on a performance requirement of the application, such as, e.g., damage level of the specimen that can be accepted, accuracy, throughput, etc. The second number can be determined so as to result in a second training image having sufficient quality to ensure the level of annotation accuracy, while maintaining the relevancy/correspondence to the first training image in terms of, e.g., dimensions, patterns etc. For instance, in some cases, the first number of training frames can be, for instance, around 10-20 frames, and the second number of training frames can be, for instance, around 50-60 frames.

The one or more reference areas on a specimen that share the same given design pattern can be identified in various ways. By way of example, design data of a die (or portion(s) thereof) can comprise various design patterns which are of specific geometrical structures and arrangements. In some embodiments, the design data can be received, and a plurality of design groups, each corresponding to one or more die areas having the same design pattern, can be retrieved. Therefore, the areas in the die that correspond to the same design pattern can be identified. In some embodiments, the inspection area is from an inspection die of the semiconductor specimen, and a reference area can be from a reference die of the inspection die, the reference die either from the same semiconductor specimen, or from a different semiconductor specimen.

It is to be noted that, similarly as defined above, design patterns can be deemed as "the same", either when they are identical, or when they are highly correlated, or similar to each other. Various similarity measures and algorithms can be applied for matching and clustering similar design patterns, and the present disclosure should not be construed to be limited by any specific measures used for deriving the design groups. The clustering of design groups (i.e., the division from CAD data to the plurality of design groups) can be performed beforehand, or by the PMC 102 as a preliminary step of the presently disclosed process.

It is to be noted that the relatively low SNR and relatively high SNR in some cases can be defined with respect to a threshold which may be a predetermined SNR level pertaining to a specific examination application (e.g., a SNR that is sufficient for the application to meet performance requirements with respect to, e.g., sensitivity, accuracy, throughput, etc.). In some cases, the relatively low SNR and relatively high SNR can be defined with respect to each other, e.g., as long as the low SNR is relatively lower than the high SNR, or the high SNR is relatively higher than the low SNR. As described above with respect to determination of the first number of frames, the low SNR (which corresponds to the SNR level of the runtime image) can be defined, e.g., based on a performance requirement of the specific examination application, such as, e.g., damage level of the specimen that can be accepted, accuracy, throughput, etc. The high SNR can be defined to ensure the level of annotation accuracy on the second training image, while maintaining the relevancy/correspondence of the second training image to the first training image in terms of, e.g., dimensions, patterns etc.

FIG. 4 illustrates a generalized flowchart of generating a training set for training a ML model usable for examining a semiconductor specimen in accordance with certain embodiments of the presently disclosed subject matter.

For a given reference area (of the one or more reference areas), a first training image with a low SNR can be acquired (402) (e.g., by the examination tool 120). A second training image with a high SNR can be acquired (404) (e.g., by the examination tool 120). By way of example, as described above, the first training image can be generated based on a first number ($N_1$) of training frames (e.g., 10-20 frames) acquired for a reference area, and the second training image can be generated based on a second number ($N_2$) of training frames (which is larger than the first number, e.g., 50-60 frames) acquired for the reference area.

In some embodiments, the first training image should be acquired before acquiring the second training image. This is because the first training image is supposed to represent a similar image condition as the runtime image obtained in the production phase. As is known, during the image acquisition by an electron beam tool, the surface of the specimen is scanned with a focused beam of electrons and the specimen continuously collects charges. The buildup of the surface charge on a specimen caused by the electron beam may cause image artifacts, such as, e.g., image distortion, variations related to gray level, contrast, edge sharpness, etc. Therefore, in order for the first training image to be acquired in a similar condition as a runtime image, for each given area, the first training image should be acquired first, before accumulation of further charging effects on the specimen, similarly as when the runtime image is acquired in runtime. The second image can be acquired after acquisition of the first image, without changing any tool configurations.

In some embodiments, the first training image is first acquired, e.g., by acquiring $N_1$ frames. Then the second training image is acquired, e.g., by acquiring $N_2$ frames ($N_2 > N1$). In some cases, the $N_1$ frames can be a part of the $N_2$ frames. For instance, SEM can first acquire $N_1$ frames which will be combined into the first training image. Then SEM can continue to acquire ($N_2 - N_1$) frames which will be combined together with the $N_1$ frames to form the second training images. In some other cases, the $N_2$ frames can be separately acquired, not including the $N_1$ frames.

In some embodiments, optionally, a training image can comprise multiple channels captured from different perspectives. For instance, one channel can be taken from a perpendicular perspective by a top detector of the examination tool, and another channel can be taken by a side detector of the examination tool from a side perspective. In some cases, there can be more than one side detector from different angles, and, accordingly, the training image can comprise multiple side-channel images. In some cases, the multiple channel images can be combined into one combined image.

The second training image with the high SNR is then annotated (406) (e.g., by the training set generator 104). As aforementioned, it is preferred to perform annotation on a high SNR image so as to improve the accuracy of the annotated label data which will be used as ground truth data for training the ML model. The label data can be obtained in various ways. By way of example, the label data can be obtained by manual annotation, or can be synthetically produced (e.g., using design data such as CAD-based images). By way of another example, the ground truth data can be generated based on machine learning. For instance, a machine learning model can be trained using manually annotated images, and the trained model can be used to automatically (or semi-automatically) generate label data for input images. An example of a machine learning based label data generation system is described in U.S. patent application Ser. No. 16/942,677 titled "GENERATING TRAINING DATA USABLE FOR EXAMINATION OF A SEMICONDUCTOR SPECIMEN" which is incorporated herein by reference in its entirety. In some cases, the label data can be generated as a combination of any of the above. The present disclosure is not limited to a specific way of obtaining the label data of the second training image.

The first training image and the second training image can be registered (408) for purpose of correcting an offset therebetween, so that the first training image and the label data are aligned. The offset between the two training images can be caused by various factors, such as, e.g., drifts caused by charging effects, by the working point of the tool (e.g., scanner and/or stage drift), and/or by shrinkage of the specimen, etc. The image registration as referred to in the present disclosure can include measuring an offset between two images, and shifting one image relative to the other in order to correct the offset. In particular, in the present disclosure, once the offset is measured, the label data as annotated in the second training image (i.e., the high SNR image) can be shifted (with or without the second image itself) in accordance with the offset (relative to the first training image), in order to be aligned with the low SNR image. Alternatively, the first training image can be shifted in accordance with the offset (relative to the second training image) to be aligned with the label data (as well as with the second training image).

The registration can be implemented according to any suitable registration algorithms known in the art. By way of example, the registration can be performed using one or more of the following algorithms: an area-based algorithm, feature based registration, or phase correlation registration. An example of an area-based method is registration using optical flow such as the Lucas-Kanade (LK) algorithm. Feature based methods are based on finding distinct informative points ("features") in two images, and calculating the needed transformation between each pair, based on correspondence of the features. This allows for an elastic registration (i.e., non-rigid registration), where different areas are moved separately. Phase correlation registration (PCR) is done using frequency domain analysis (where phase difference in the Fourier domain is translated into registration in the image domain).

A training sample for training the ML model is thus generated (410) including the registered first training image and the label data. In some embodiments, one or more additional training samples can be acquired in a similar manner from one or more additional reference areas.

A training set comprising one or more training samples generated as described in FIG. 4 can be used to train the ML model in a supervised manner. The ML model, upon being trained, is usable for processing a runtime image representative of an inspection area of the specimen sharing the same design pattern as the given design pattern, and obtaining examination data specific for the given examination application. The runtime image is acquired with a relatively low SNR (same/similar to the low SNR of the first training image as described above).

Figure 5:
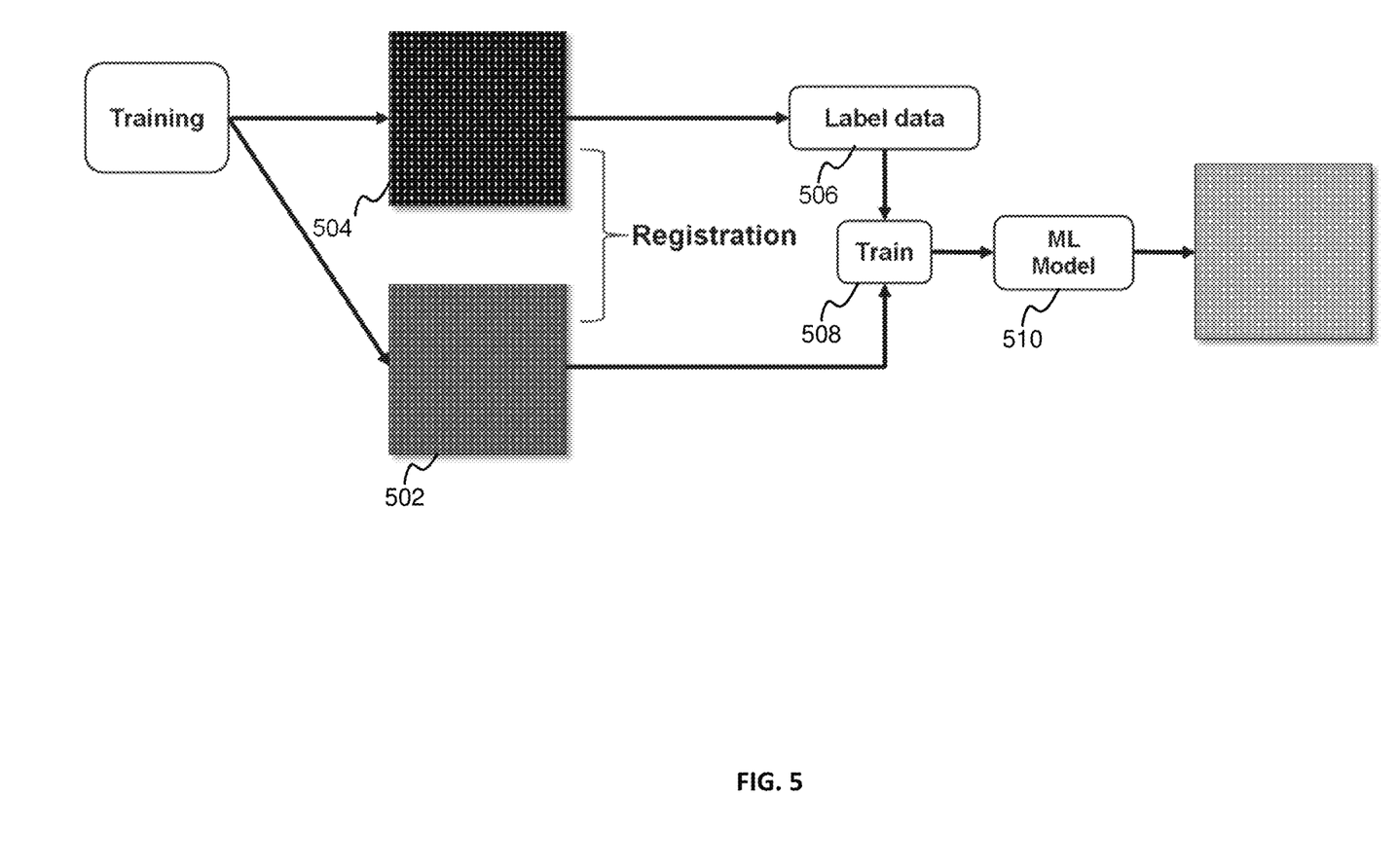
FIG. 5 shows a schematic illustration of a training process of a ML model in accordance with certain embodiments of the presently disclosed subject matter.

FIG. 5 shows a schematic illustration of a training process of a ML model in accordance with certain embodiments of the presently disclosed subject matter. During the training phase, the training set as generated in accordance with the description of FIGS. 2 and 4 can be obtained, comprising one or more training samples. Specifically, a first training image 502 which is a low SNR image representative of a reference area of a specimen is acquired. A second training image 504 which is a high SNR image of the same reference area is acquired. The second training image 504 is annotated to obtain label data (506) thereof (e.g., a segmentation map associated with the second training image, in an example of a segmentation application). The two images 502 and 504 are registered, such that either the label data or the first training image 502 is fixed in accordance with the offset therebetween. A training sample, which includes the registered first training image 502 and label data 506, is thus generated. The training sample can be used to train (508) the ML model 510, thereby obtaining a trained ML model characterized by segmentation-related training parameters. In some embodiments, the training process can be cyclic, and can be repeated several times until the ML model is sufficiently trained, e.g., to be able to provide an output of a segmentation map meeting an accuracy criterion. By way of example, the ML model can be trained using a cost function related to segmentation accuracy (e.g., the ground truth label data vs. predicted segmentation map).

Although only one training sample is illustrated in FIG. 5, this is not intended to limit the present disclosure in any way. In some embodiments, one or more additional training samples can be obtained in a similar manner, and the training process can be repeated using the additional training samples. In some cases, optionally, the trained ML model can be validated using a validation set of images. The validation set of images can be a different image set from the training set, and can comprise images selected for validation purposes. A user can provide feedback for the results reached by the ML model during training or validation.

Referring now to FIG. 3, there is illustrated a generalized flowchart of runtime examination of a semiconductor specimen using a trained ML in accordance with certain embodiments of the presently disclosed subject matter.

A runtime image (e.g., a FP image as described above) representative of an inspection area of the semiconductor specimen can be obtained (302) (e.g., by the examination tool 120) during runtime examination of the specimen. The runtime image has a relatively low signal-to-noise ratio (SNR) (e.g., with respect to a high SNR as described herein, or with respect to a threshold). By way of example, the runtime image can be acquired by an electron beam tool, such as, e.g., SEM.

The runtime image can be processed (304) using a machine learning (ML) model (e.g., the ML model 108 in PMC 102) to obtain examination data specific for a given examination application. The ML model can be previously trained for the given examination application using one or more training samples, each representative of a respective reference area sharing same design pattern as the inspection area, as described above with respect to FIGS. 2 and 4. Specifically, each training sample comprises a first training image (204) of the respective reference area having a relatively low signal-to-noise ratio (SNR) (e.g., relatively lower with respect to the high SNR or a threshold), and label data (206) indicative of ground truth in the respective reference area pertaining to the given examination application. The label data is obtained by annotating a second training image of the respective reference area having a relatively high SNR. As described above, the first training image is acquired in a similar imaging condition as the runtime image (in terms of electron dose, number of frames, etc.), such that the low SNR of the first training image is the same/similar (e.g., being identical, or similar to, or highly correlated with) as the low SNR of the runtime image. Thus, the low SNR of the first training image and the low SNR of the runtime image can be similar/equivalent to a certain extent, and do not have to be exactly the same. Various similarity measures and algorithms can be used for determining the extent/level of equivalence/similarity therebetween.

As aforementioned, the examination application referred to herein can be any application from a group comprising (but not limited to): a segmentation application for segmenting a runtime image into one or more segments in an inspection area, a metrology application for obtaining one or more measurements for a structural feature in the inspection area, a defect detection application for detecting one or more defect candidates in the inspection area, and a defect classification application for classifying one or more defect candidates in the inspection area.

According to certain embodiments, the examination application can be a segmentation application. The term "segmentation" used herein may refer to any process of partitioning an image into meaningful parts/segments (for example, background and foreground, noisy and non-noisy areas, various structural elements, defects and non-defects, etc.) whilst providing per-pixel or per-region values indicative of such segments. In such cases, a training sample can include a first training image (e.g., a SEM image) and label data which can be a ground truth segmentation map corresponding to the SEM image (e.g., indicative of a specific segment of one or more segments that each pixel of at least part of the runtime image belongs to). By way of example, in some cases, the segments can correspond to one or more structural elements presented in the first training image. A structural element used herein can refer to any original object on the image data that has a geometrical shape or geometrical structure with a contour, in some cases combined with other object(s). A structural element can be presented, e.g., in the form of a polygon.

Upon the ML model being trained, the trained ML model can be used to process a runtime image and output a predicted segmentation map which is informative of predicted labels associated with corresponding pixels in the runtime image. Each predicted label is indicative of a segment in the runtime image to which a respective pixel belongs.

Figure 6:
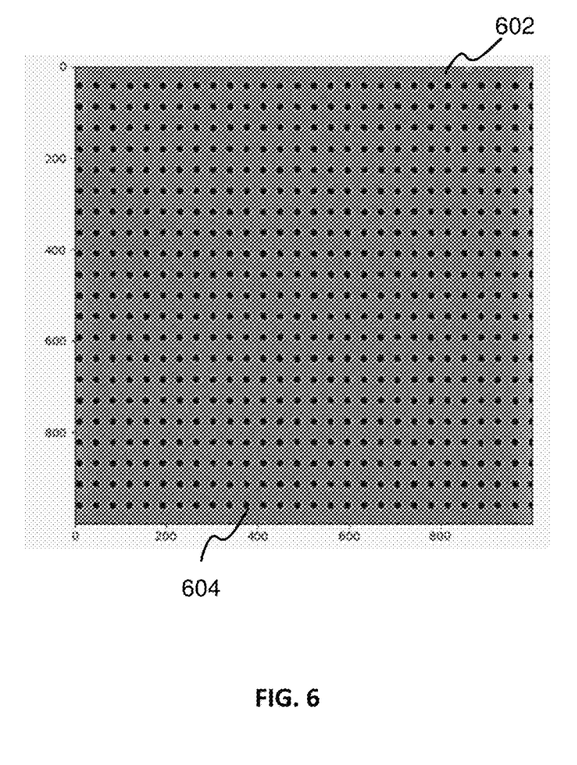
FIG. 6 illustrates an example of a first training image in accordance with certain embodiments of the presently disclosed subject matter.

FIG. 6 illustrates an example of a first training image in accordance with certain embodiments of the presently disclosed subject matter. The training image 602 is exemplified as a SEM image captured by a SEM tool and representing an area of a die of a wafer. As shown, there are a plurality of structural elements 604 (illustrated as polygons representing the elements of contacts on the wafer) presented in the image. In the present example, the label data (obtained from annotation on a second training image) can be provided as a segmentation map such as, e.g., a binary map representing two segments, the first segment corresponding to the structural elements in the image, and the second segment corresponding to the background area.

Figure 7:
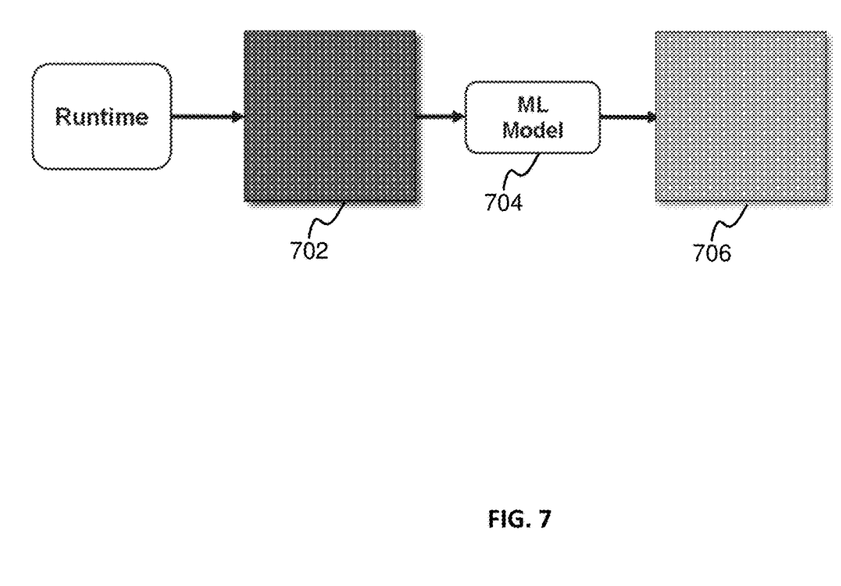
FIG. 7 is a schematic illustration of a runtime examination process using a ML model in accordance with certain embodiments of the presently disclosed subject matter.

FIG. 7 is a schematic illustration of a runtime examination process using a ML model in accordance with certain embodiments of the presently disclosed subject matter. During runtime, a runtime image 702 of a specimen with a low SNR is acquired and processed by the trained ML model 704 to obtain examination data specific for a given examination application. By way of example, in a segmentation application, the output examination data can be a segmentation map 706 corresponding to the runtime image 702. The obtained segmentation map can be informative of per-pixel or per-region segmentation labels indicative of different segments on the image. By way of example, the polygons on one layer can have one segmentation label, and the polygons on another layer can have a different segmentation label, while the background can have a separate segmentation label.

In some embodiments, such a segmentation map can be used by metrology tools for performing measurements on the specimen. By way of another example, it can also be usable for ADC when constructing attributes (e.g., for defining if a defect is on the main pattern, on the background, or both), or for ADR for applying segment-specific detection thresholds on each segment, etc.

In some embodiments, the examination application is a defect classification application. The label data acquired in such cases can be informative of classes of defects presented in a reference area (e.g., particles, pattern deformation, bridges, etc.), and optionally, the probabilities thereof for the defects to belong to these classes. A cost function used during training of the ML can be based on classification errors between the predicted classes and the ground truth (class labels) thereof.

In some embodiments, the examination application is a defect detection application. The label data acquired in such cases can be informative of whether a defect candidate from a list of defect candidates presented in a reference area is a defect of interest (DOI), or nuisance. For instance, the label data can be provided, e.g., in the form of bounding boxes of the DOIs, or in the form of a binary image in which only pixels belonging to DOIs get a value of "1", and non-defective pixels get a value of "0" etc. A cost function used during training of the ML can be based on detection accuracy/capture rate, and, optionally, also based on a penalty for misdetection and over-detections.

In some embodiments, the examination application is a metrology application. The label data acquired in such cases can be informative of one or more measurements (e.g., CD measurements) with respect to a structural element in an inspection area. A cost function used during training of the ML can be based on measurement accuracy of the predicted measurements with respect to the ground truth measurements.

According to some embodiments, the ML model can be implemented as a classifier. The term "classifier", "classifier model" or "classification model" referred to herein should be broadly construed to cover any learning model capable of identifying to which of a set of categories/classes a new instance belongs, on the basis of a training set. By way of example, in the exemplified segmentation application, the classifier can be trained to classify the pixel candidates into a set of segment classes as defined by the user. The trained classifier can be used for image segmentation, i.e., for providing a predicted label for each pixel in an image indicating the segment to which it belongs. It is to be noted that the classifier can be implemented as various types of machine learning models, such as, e.g., Linear classifiers, Support vector machines (SVM), neural networks, decision trees, etc., and the present disclosure is not limited by the specific model implemented therewith.

According to certain embodiments, the training process as described above with reference to FIGS. 2 and 4 can be included as part of a process for generating an examination recipe usable by system 101 and/or the examination tool 120 for online examination in runtime (where the ML model, once trained, can serve as part of the examination recipe). Therefore, the presently disclosed subject matter also includes a system and method for generating an examination recipe during a recipe setup phase as described with reference to FIGS. 2 and 4 (and various embodiments thereof). It is to be noted that the term "examination recipe" should be expansively construed to cover any recipe that can be used by an examination tool for any examination application including the embodiments as described above.

It is to be noted that examples illustrated in the present disclosure, such as, e.g., the various ways of obtaining the first and second training images, the exemplified examination applications and label data thereof, etc., are illustrated for exemplary purposes, and should not be regarded as limiting the present disclosure in any way. Other appropriate examples/implementations can be used in addition to, or in lieu of the above.

Among advantages of certain embodiments of the training process as described herein is that it enables to acquire annotation from a high SNR image and associate it with a low SNR image, where the label data and the low SNR image together are used as a training sample for training a ML model. This ensures the accuracy of the acquired label data which serves as ground truth for the training, while enables the ML model to be trained on low SNR images having similar imaging conditions as the runtime images that will be examined in runtime, thus improving the performance of the trained ML model in runtime examination in terms of robustness and accuracy.

Among further advantages of certain embodiments of the training process as described herein, is that it enables examination of certain sensitive layers of a specimen which were previously not possible to be inspected, since these layers require minimal electron dose during inspection in order to reduce pattern damage, which results in images with very low SNR, and annotation is not feasible to be performed on such low SNR images.

Among further advantages of certain embodiments of the training process as described herein is that, as annotation on an image of high SNR is easier and faster, this further improves the user experience of annotation and time to recipe (TTR) for training the ML.

It is to be understood that the present disclosure is not limited in its application to the details set forth in the description contained herein or illustrated in the drawings. It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

What is claimed is:

1. A computerized system of runtime examination of a semiconductor specimen, the system comprising a processing and memory circuitry (PMC) configured to:

obtain a runtime image representative of an inspection area of the semiconductor specimen, the runtime image having a low signal-to-noise ratio (SNR); and process the runtime image using a machine learning (ML) model to obtain examination data specific for a given examination application, wherein the ML model is previously trained for the given examination application using one or more training samples, each training sample representative of a respective reference area sharing same design pattern as the inspection area and comprising:

a first training image of the respective reference area having a low SNR similar to the low SNR of the runtime image; and label data indicative of ground truth in the respective reference area pertaining to the given examination application, the label data obtained by annotating a second training image of the respective reference area having a high SNR, wherein the high SNR is defined to ensure a level of annotation accuracy on the second training image while maintaining correspondence between the second training image and the first training image.

2. The computerized system according to claim 1, wherein the runtime image and the one or more training samples are acquired by an electron beam tool.

3. The computerized system according to claim 1, wherein the given examination application is one of: a segmentation application for segmenting the runtime image into one or more segments in the inspection area, a metrology application for obtaining one or more measurements with respect to a structural element in the inspection area, a defect detection application for detecting one or more defect candidates in the inspection area, and a defect classification application for classifying one or more defects in the inspection area.

4. The computerized system according to claim 1, wherein the first training image is generated based on a first number of training frames acquired for the reference area, and the second training image is generated based on a second number of training frames acquired for the reference area, wherein the first number is smaller than the second number, and wherein the runtime image is generated based on the first number of runtime frames.

5. The computerized system according to claim 4, wherein the second number of training frames comprise the first number of training frames.

6. The computerized system according to claim 1, wherein the first training image is generated based on a first dose of electrons, and the second training image is generated based on a second dose of electrons, wherein the first dose is less than the second dose, and wherein the runtime image is generated based on the first dose of electrons.

7. The computerized system according to claim 1, wherein the label data is obtained based on at least one of: manual annotation, synthetically generated labels based on design data, machine learning derived labels, or a combination thereof.

8. The computerized system according to claim 1, wherein the first training image and the second training image are registered to correct an offset therebetween, so that the first training image and the label data are aligned.

9. The computerized system according to claim 1, wherein the first training image is acquired prior to acquisition of the second training image.

10. The computerized system according to claim 1, wherein the inspection area is a part of a sensitive layer of the semiconductor specimen which is inspectable only via images having a low SNR.

11. The computerized system according to claim 1, wherein the given examination application is a segmentation application for segmenting the runtime image into one or more segments in the inspection area, and the label data is indicative of a specific segment of the one or more segments that each pixel of at least part of the runtime image belongs to.

12. The computerized system according to claim 1, wherein the inspection area is from an inspection die of the semiconductor specimen, and the respective reference area is from a reference die of the inspection die from the semiconductor specimen or from a different semiconductor specimen.

13. A computerized method of training a machine learning (ML) model usable for examining a semiconductor specimen, the method performed by a processing and memory circuitry (PMC) and comprising:
obtaining a training set comprising one or more training samples, each training sample representative of a respective reference area having a given design pattern, the training sample comprising:
a first training image having a low signal-to-noise ratio (SNR); and
label data indicative of ground truth in the respective reference area pertaining to a given examination application, the label data obtained by annotating a second training image of the respective reference area having a high SNR, wherein the high SNR is defined to ensure a level of annotation accuracy on the second training image while maintaining correspondence between the second training image and the first training image; and
training the ML model for the given examination application using the training set;
wherein the ML model, upon being trained, is usable for processing a runtime image representative of an inspection area of the semiconductor specimen sharing same design pattern as the given design pattern and obtaining examination data specific for the given examination application, the runtime image having a low SNR similar to the low SNR of the first training image.

14. The computerized method according to claim 13, wherein the given examination application is one of: a segmentation application for segmenting the runtime image into one or more segments in the inspection area, a metrology application for obtaining one or more measurements with respect to a structural element in the inspection area, a defect detection application for detecting one or more defect candidates in the inspection area, and a defect classification application for classifying one or more defects in the inspection area.

15. The computerized method according to claim 13, wherein the obtaining the training set comprises generating the first training image based on a first number of training frames acquired for the reference area, and generating the second training image based on a second number of training frames acquired for the reference area, wherein the first number is smaller than the second number, and wherein the runtime image is generated based on the first number of runtime frames.

16. The computerized method according to claim 13, wherein the obtaining the training set comprises generating the first training image based on a first dose of electrons, generating the second training image based on a second dose of electrons, wherein the first dose is less than
the second dose, and wherein the runtime image is generated based on the first dose of electrons.

17. The computerized method according to claim 13, wherein the obtaining the training set comprises registering the first training image and the second training image to correct an offset therebetween, so that the first training image and the label data are aligned.

18. The computerized method according to claim 13, wherein the first training image is acquired prior to acquisition of the second training image.

19. The computerized method according to claim 13, wherein the given examination application is a segmentation application for segmenting the runtime image into one or more segments in the inspection area, and the label data is indicative of a specific segment of the one or more segments that each pixel of at least part of the runtime image belongs to.

20. A non-transitory computer readable storage medium tangibly embodying a program of instructions that, when executed by a computer, cause the computer to perform a method of runtime examination of a semiconductor specimen, the method comprising:
obtaining a runtime image representative of an inspection area of the semiconductor specimen, the runtime image having a low signal-to-noise ratio (SNR); and
processing the runtime image using a machine learning (ML) model to obtain examination data specific for a given examination application, wherein the ML model is previously trained for the given examination application using one or more training samples, each training sample representative of a respective reference area sharing same design pattern as the inspection area and comprising:
a first training image of the respective reference area having a low SNR similar to the low SNR of the runtime image; and
label data indicative of ground truth in the respective reference area pertaining to the given examination application, the label data obtained by annotating a second training image of the respective reference area having a high SNR, wherein the high SNR is defined to ensure a level of annotation accuracy on the second training image while maintaining correspondence between the second training image and the first training image.

* * * * *